United States Patent [19]
Flaischlen

[11] 3,882,647
[45] May 13, 1975

[54] WORKPIECE HOLDER

[75] Inventor: Ekkehard Flaischlen, Stuttgart, Germany

[73] Assignee: Fortuna-Werke Maschinenfabrik AG, Stuttgart, Germany

[22] Filed: Apr. 4, 1973

[21] Appl. No.: 347,918

[30] Foreign Application Priority Data
Apr. 12, 1972 Germany.......................... 2217432

[52] U.S. Cl.................. 51/237 R; 82/42; 279/55
[51] Int. Cl....... B24b 5/04; B23b 33/00; B23b 5/08; B23b 31/12
[58] Field of Search........ 279/55, 46, 35; 51/217 R, 51/217 T, 237 R, 237 CS; 82/42, 45

[56] References Cited
UNITED STATES PATENTS

| 749,794 | 1/1904 | Inman | 51/217 T X |
|---|---|---|---|
| 2,207,621 | 7/1940 | Hite | 279/35 X |
| 2,496,545 | 2/1950 | Kraemer | 279/55 X |
| 2,593,706 | 4/1952 | Von Zelewsky | 51/217 T X |
| 2,693,365 | 11/1954 | Von Zelewsky | 51/217 R |
| 2,716,311 | 8/1955 | Berstecher | 51/103 |
| 3,422,709 | 1/1969 | Rees | 279/16 |

FOREIGN PATENTS OR APPLICATIONS

| 130,365 | 3/1960 | U.S.S.R. | 51/237 |
| 583,893 | 1/1947 | United Kingdom | 51/217 R |

*Primary Examiner*—Al Lawrence Smith
*Assistant Examiner*—Marc R. Davidson
*Attorney, Agent, or Firm*—Michael S. Striker

[57] ABSTRACT

A workpiece holder for workpieces which are to be turned and are engaged at their opposite axial ends by centering elements. An annular member of the workpiece holder has an open end bounded by three or more curved cam portions each of which extends circumferentially and from a point farthest spaced from to a point closest to the center axis of the opening. A number of gripping rollers corresponding to that of the cam portions is lodged in the opening, each associated with one of the cam portions, and the rollers define between themselves a workpiece-receiving passage coaxial with the center axis. A guide member mounts the rollers and guides the same so that they can move relative to the annular member in direction closer to and farther from the central axis, and springs are provided which permanently bias the rollers radially outwardly into engagement with the cam portions. A drive is provided for rotating the annular member about its central axis and a retarding arrangement is operable for retarding the guide member against rotation in unison with the annular member.

8 Claims, 3 Drawing Figures

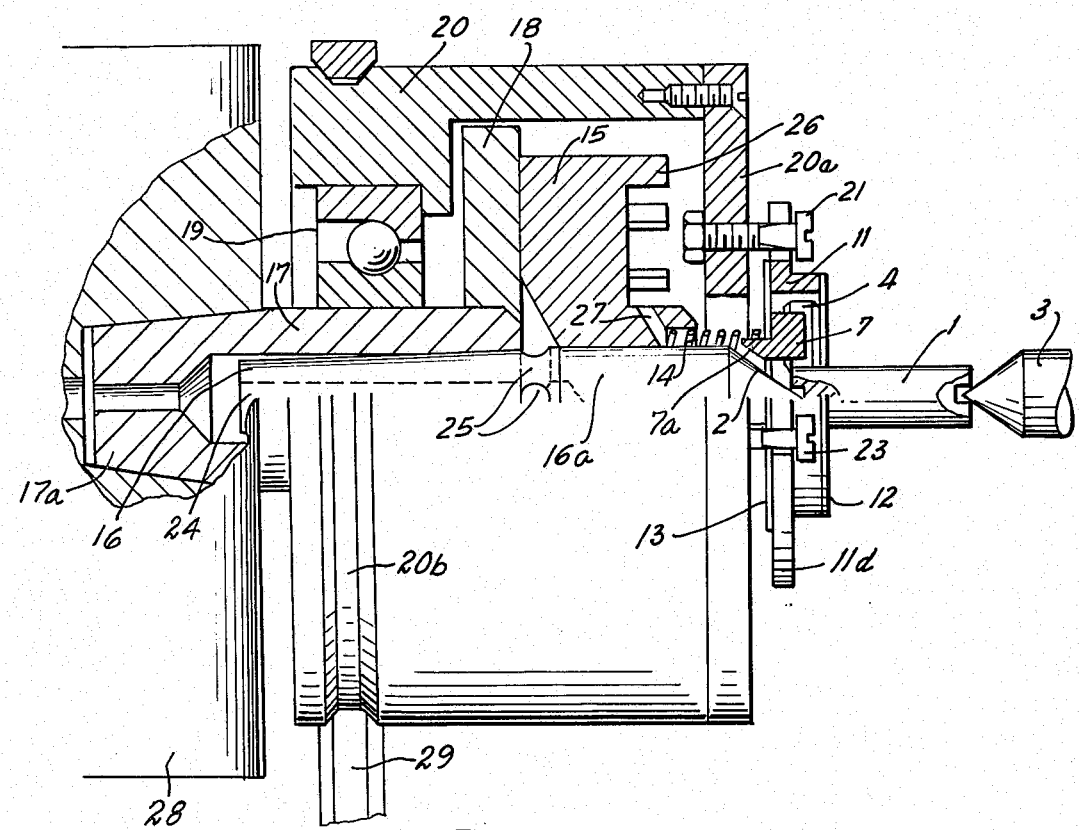

WORKPIECE HOLDER

BACKGROUND OF THE INVENTION

The present invention relates generally to a workpiece holder, and more particularly to a holder for workpieces which are engaged at their opposite axial ends by centering elements and which are to be rotated while so engaged. Still more particularly the invention relates to a workpiece holder which is particularly suitable for holding and effecting rotation of workpieces in various machines, such as grinding machines, polishing machines or the like.

Where workpieces must be mounted and rotated while being worked, for instance ground, polished, or the like, it is conventional to engage them from opposite axial ends by means of centering elements which hold the workpiece in place while permitting it freedom of rotation about an axis extending between the centering elements. Devices are known which then engage the thus-mounted workpiece and rotate it so that its entire circumference can be subjected to the particular operation in question, for instance polishing or the like. There are, however, certain circumstances where the known arrangements mentioned above cannot be used. Thus, in the case of workpieces have a small diameter, e.g., less than 10 millimeters, the devices for rotating the workpieces cannot be utilized. A small diameter of the workpiece usually means that the workpiece is also of small length. If a conventional workpiece-rotating arrangement would be utilized under these circumstances, its size relative to that of the workpiece would necessarily mean that a large portion of the workpiece would be covered over by the rotating device and would be inaccessible to the tool or tools. Moreover, the small dimensions of such workpieces mean that the workpiece requires a relatively brief time for completion of whatever work is to be performed on it, so that the utilization of a usual workpiece-rotating device would require a length of time for installation on the workpiece which would be a multiple of the actual working time. These are evidently disadvantages, to which there must be added the further disadvantage that the known workpiece-rotating devices do not permit the workpiece-engaging and -releasing operation to be automated.

SUMMARY OF THE INVENTION

It is, accordingly, a general object of the present invention to overcome the disadvantages of the prior art.

More particularly, it is an object of the present invention to provide a novel workpiece holder which is not possessed of the aforementioned disadvantages.

An additional object of the invention is to provide such a workpiece holder which reliably and without damage can engage and rotate workpieces of small diameters.

An additional object of the invention is to provide such a workpiece holder which can be utilized in conjunction with equipment for automating the operation in question, particularly the engagement and release of the workpiece.

In keeping with these objects, and others which will become apparent hereafter, one feature of the invention resides in a workpiece holder which, briefly stated, comprises an annular member having an opening bounded by at least three curved cam portions each extending circumferentially and from a point farthest spaced from to a point closest to the center axis of the opening. At least three gripping rollers are provided in the opening and are each associated with one of the cam portions. These rollers define between themselves a workpiece-receiving passage coaxial with the central axis. Spring means permanently biases the rollers radially outwardly and into engagement with the cam portions, and a guide member mounts the roller and guides the same for movement relative to the annular member in direction closer to and farther from the central axis. Rotating means is provided for rotating the annular member about the central axis, and retarding means is operable for retarding the guide member against rotation in unison with the annular member.

The novel workpiece holder fulfills all of the requirements made of it and is, in addition, very simple in its construction. Moreover, the novel workpiece holder will reliably engage and rotate workpieces whose diameters may be rather widely divergent.

It is particularly advantageous if the annular member and the guide member are mounted with a certain amount of limited play relative to the stationary workpiece-engaging and centering members which engage the workpiece from opposite axial ends thereof, because then the workpiece holder can automatically center itself during operation.

The invention contemplates in one embodiment that the guide member is coupled with the retarding means by the aid of a torsion spring, and that the retarding means can be disengaged or uncoupled. With such an arrangement it is not necessary to shut down the rotating means which rotates the annular member, but instead the annular member which transmits torque can rotate continuously. This already meets a precondition for successful automation of the operation.

The novel features which are considered characteristic of the invention are set forth in the appended claims. The invention itself, however, both as to its construction and its method of operation, together with additional objects and advantages thereof, will best be understood from the following description of specific embodiments when read in connection with the accompanying drawing.

BRIEF DESCRIPTION OF THE DRAWING

FIG. 1 is a fragmentary axial section illustrating one embodiment of the invention;

FIG. 2 is a partly sectioned detail view of the embodiment in FIG. 1; and

DESCRIPTION OF THE PREFERRED EMBODIMENTS

Figure 3:
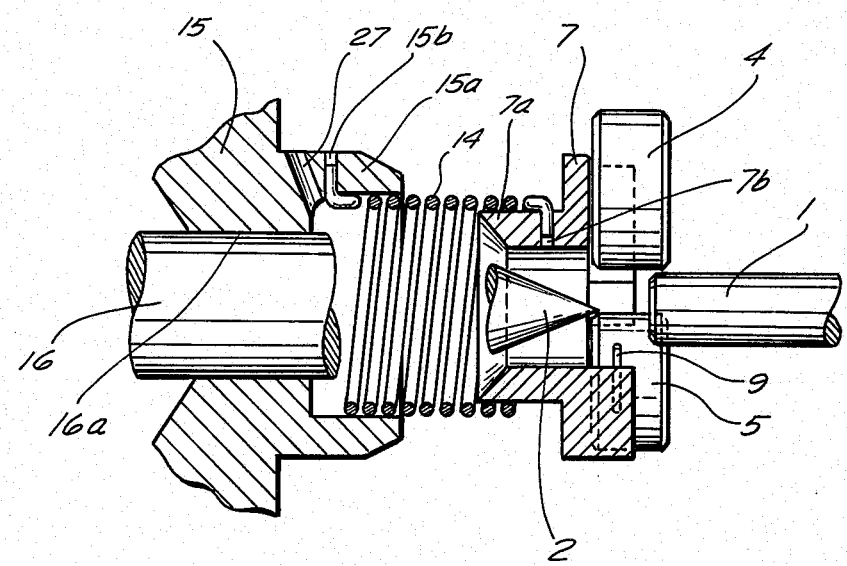
FIG. 3 is a section on line III—III of FIG. 2, with portions omitted for clarity.

Discuss the drawing in detail, wherein a single embodiment of the invention has been shown by way of example, it will be seen that reference numeral 1 identifies a workpiece which is to be worked, for instance polished, ground, or otherwise processed. In conventional manner the workpiece is mounted and centered by two centering members 2 and 3 which engage it from opposite axial ends. The centering member 2 is fixed against axial movement whereas the centering member 3 can be axially moved into and out of engagement with the workpiece 1.

The workpiece is engaged by a workpiece holder which holds it and causes it to rotate if and when desired. The holder comprises a number of rollers which is not less than three. In the illustrated embodiment three such rollers 4, 5 and 6 are provided which are angularly spaced about the workpiece, that is which define with one another a passage in which the workpiece is receivable. The rollers 4, 5 and 6 are mounted in an annular guide member 7 which permits them freedom of radial movement closer to and farther from the center axis of the passage which they define between themselves. Spring elements 8, 9 and 10 are provided which permanently urge the rollers 4, 5 and 6, respectively, in radially outward direction.

The rollers 4, 5 and 6 are surrounded by the inner circumferential surface bounding an opening in an annular member 11. The inner circumferential surface is provided with a number of cam portions corresponding to the number of rollers; here, there are three such cam portions provided which are designated with reference numerals 11a, 11b, 11c, respectively. Each of these cam portions, which are all spaced about the circumference of the opening in the annular member 11, is curved in circumferential direction and is so shaped that it extends from a point farthest spaced from to a point closest to the central axis of the opening in the annular member 11, which central axis coincides with the central axis of the passage defined by the rollers 4, 5 and 6.

It will be seen that relative angular displacement of the members 11 and 7 will result in displacement of the rollers 4, 5 and 6 in a radial direction, namely radially inwardly into wedging engagement with a workpiece 1 which is located in the passage surrounded by the rollers 4, 5 and 6. Relative angular displacement of the members 11 and 7 in the opposite direction will cause the rollers to be biased radially outwardly by the springs associated with them, so that they will recede from the workpiece and free the same.

At the opposite axial ends of the member 11 there are provided cover members 12 and 13 which maintain the various components against axial movement out of their relative positions, and which in particular maintain the rollers in their predetermined locations.

The member 7 has a projection 7a onto which the end of a torsion spring 14 is pushed and retained in place, for instance by clamping. The opposite end of the spring 14 is connected to a turnably mounted disk 15. A portion 16a of a cone 16 which carries the centering member 2, is configured as a slide bearing surface for the disk 15. A conical member 17 accommodates the non-rotatable cone 16 and also a non-rotatably mounted member 18. Its end portion 17a is non-rotatably mounted in a stationary support 28. It further carries a bearing 19, or more than one on which the portion 20 is mounted for rotation relative to the cone 16, the member 17 and the member 18 which are stationary and connected to each other against relative axial and rotational displacements. It will be seen that the retarding arrangement or unit in this embodiment is composed of the members 15 aand 18. It is surrounded in the manner of a housing by a portion 20 of a rotating arrangement or drive which is mounted on the bearing 19 and has an end wall 20a which carries the annular member 11 with a certain play. A pulley groove 20b is formed in the portion 20 so that the latter can be rotated via a belt 29. The member 11 has a flange 11d provided with radial slots through which screws 21, 22 and 23 extend into engagement with the end wall 20a. The latter is provided with a central bore through which the torsion spring 14 extends. As the spring 14 is also a compression spring, it urges the disk 15 into engagement with the member 18. The outer circumferential surface of the portion 20 can be engaged by for instance the aforementioned drive belt which is driven by a non-illustrated motor or the like.

FIG. 3 shows that the member 15 is turnably and axially shiftably mounted on the surface 16a of the member 16. The ends of the torsion spring are retained in slots 15b and 7b; projections 7a and 15a serve to stabilize the spring 14.

In operation of the illustrated embodiment the workpiece 1 is placed between the centering members 2 and 3 and engaged thereby and centered by them. This can be done manually or automatically. In so doing it extends through the passage defined between the rollers 4, 5 and 6. Now, the drive for the workpiece holder is switched on so that the portion 20 with the end wall 20a, begins to rotate, taking along the annular member 11. Initially, the guide member 7 does not rotate so that the rollers 4, 5 and 6 roll along the cam portions 11a, 11b and 11c until they are in tight clamping engagement with the workpiece 1, at which time the member 7 together with the workpiece 1 and the disk 15 also begin to rotate. The work to be carried out can be performed on the workpiece 1 which is reliably engaged by the centering members 2 and 3.

When the work is completed, the removal of the workpiece can be effected in several ways.

The simplest although not necessarily the easiest way is to switch off the drive and to retract the member 3, whereupon the portion 20 is turned (e.g., manually) in direction opposite to its previous rotation until the rollers 4, 5 and 6 recede from and free the workpiece 1. The workpiece can now be withdrawn and a new one put in its place. In this particular instance the torsion spring 14 is not absolutely necessary because the elastic coupling which it affords between the member 7 and the disk 15 is not required. If the spring 14 is utilized, or if it is replaced with another coupling element, then the only purpose will be in this instance to maintain the member 7 and thereby also the member 11 with freedom of play relative to the centering members 2 and 3.

It will be appreciated, however, that with the approach just outlined it is not very well possible to automate the removal and installation of the workpieces. A further approach which is easier, especially in terms of automation, utilizes the axial bore 24 which is illustrated as being provided in the cone 16. Pressure fluid, such as compressed air, can be admitted through the bore 24 and from there via radial bores 25 into the space between the body 18 and the disk 15 to move them out of contact with one another. With this arrangement it is not necessary to shut down the drive, so that the member 11 can rotate continuously. When the workpiece 1 is to be released, compressed air is to be admitted through the bore 24 and the bores 25, causing the disk 15 to be lifted out of engagement with the member 18 whereby the retardation effect is terminated. Now, the torsion spring 14 can relax and in so doing will rapidly accelerate the disk 15. Due to the mass of the disk 15 the latter will tend to overrun the acceleration provided by the spring, taking along the guide member 7 which thus will rotate for a brief period of time at a faster rate of speed than the annular member 11. This permits the rollers 4, 5 and 6 to roll in radially outward direction on their respective cam portions 11a, 11b and 11c. Thus, the workpiece 1 will be released, and when the centering member 3 has been retracted, it can be withdrawn.

It must be kept in mind, however, that only a relatively brief period of time is available for the withdrawal of the workpiece because the disk 15 will oscillate back and forth under the influence of the spring 14 with a decreasing amplitude, so that the installation of a new workpiece must be coordinated with this factor. If necessary the disk 15 can be braked briefly by terminating the admission of compressed air, and thereupon compressed air can again be admitted to cause the disk 15 temporarily to again accelerate to greater amplitude so that a new workpiece can be installed.

An even more advantageous manner of removing a completed workpiece and replacing it with a new one is obtained if in its contacting position the disk 15 is in engagement with the member 18 but, when compressed air is admitted through the bore 24 as outlined above, it will be displaced not only out of engagement with the member 18 but will with its opposite side be pushed against the end wall 20a. In such an arrangement it is, however, necessary to carefully coordinate the pressure increase provided by the compressed air, the mass of the disk 15 and the torsional force supplied by the torsion spring 14. It is necessary to assure that during the initial acceleration of the disk 15 under the influence of the spring 14 the disk 15 will come in contact with the end wall 20a only at the moment at which it has reached its farthest advance, that is just before it will begin to reverse its direction of rotation, because at this moment the rollers 4, 5 and 6 will be in their radially outermost positions and, when the disk 15 engages the end wall 20a, they will remain there as long as the supply of compressed air is maintained. With this arrangement the workpiece can be removed and a new one installed without any pressure of time whatsoever. When the next workpiece is engaged and centered by the members 2 and 3, the supply of compressed air is terminated and the new workpiece is then automatically engaged and rotated by the workpiece holder. It will be appreciated that during all this time the annular element 11 will have continued to rotate uninterruptedly.

According to a further concept of the invention the arrangement composed of the components 15 and 18 is surrounded in the manner of a housing by the portion 20 of the drive and the end wall 20a. If the end wall 20a is provided with a central bore or the like, then at least a portion of the compressed air admitted for disengaging the arrangement can be vented through this central opening. Furthermore, if the projection 7a is appropriated, configurated, this vented compressed air can be so directed as to remove contaminants such as workpiece chips or the like from the workpiece holder, and it can also be directed against the workpiece 1 to aid in the removal of the completed workpiece when the latter is disengaged by the workpiece holder. To prevent the disk 15 from shutting off the flow of air as it contacts the end wall 20a disk 15 and/or end wall 20a may be provided with distancing projections 26, and the disk 15 may be provided with bores 27 for the passage of air.

Evidently, the construction according to the present invention is admirably suited for combination with an automatic system for supplying and removing workpieces, so that it is now possible to automate the entire operation, utilizing the novel workpiece holder according to the present invention.

It goes without saying that modifications of the exemplary embodiment disclosed herein are readily possible. For instance, more than three rollers could be used, or a different type of brake instead of the friction brake shown could be employed.

It will be understood that each of the elements described above, or two or more together, may also find a useful application in other types of constructions differing from the types shown.

While the invention has been illustrated and described as embodied in a workpiece holder, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting essential features of the generic or specific aspects of the invention and, therefore, such adaptations and modifications should and are intended to be comprehended within the meaning and range of equivalence of the following claims.

What is claimed as new and desired to be protected by Letters Patent is set forth in the appended claims.

1. A workpiece holder, comprising an annular member having an opening bounded by at least three curved cam portions each extending circumferentially and from a point farthest spaced from to a point closest to the center axis of said opening; at least three gripping rollers in said opening and each associated with one of said cam portions, said rollers defining between themselves a workpiece-receiving passage coaxial with said central axis; spring means permanently biasing said rollers radially outwardly and into engagement with said cam portions; a guide member mounting said rollers and guiding the same for movement relative to said annular member in direction closer to and further from said central axis; rotating means for rotating said annular member about said central axis; and retarding means operable for retarding said guide member against rotation in unison with said annular member.

2. A workpiece holder as defined in claim 1; further comprising a pair of workpiece engaging portions located adjacent opposite ends of said passage and on a line coincident with said central axis.

3. A workpiece holder as defined in claim 2, wherein said members have limited freedom of play relative to said engaging portions.

4. A workpiece holder as defined in claim 1; further comprising a torsion spring coupling said guide member with said retarding means.

5. A workpiece holder as defined in claim 4, said retarding means comprising a disengageable friction-brake unit.

6. A workpiece holder as defined in claim 4, said retarding means comprising a friction unit including a stationary element, a rotatable disk mounted for movement into and out of normal engagement with said element and coupled via said torsion spring with said guide element, and a conduit for compressed fluid so arranged that compressed fluid admitted into it will effect movement of said disk out of normal engagement with said element and into engagement with said rotating means.

7. A workpiece holder as defined in claim 6, wherein said rotating means in part surrounds said friction unit.

8. A workpiece holder as defined in claim 7, said rotating means including a wall which supports said annular member, said wall having at least one hole communicating with the region of said friction unit for venting admitted pressure fluid therefrom.

* * * * *